March 1, 1955 J. W. OVERBEKE ET AL 2,703,096
FUELING NOZZLE WITH PRESSURE OPERATED SHUTOFF
Filed April 17, 1951 5 Sheets-Sheet 1
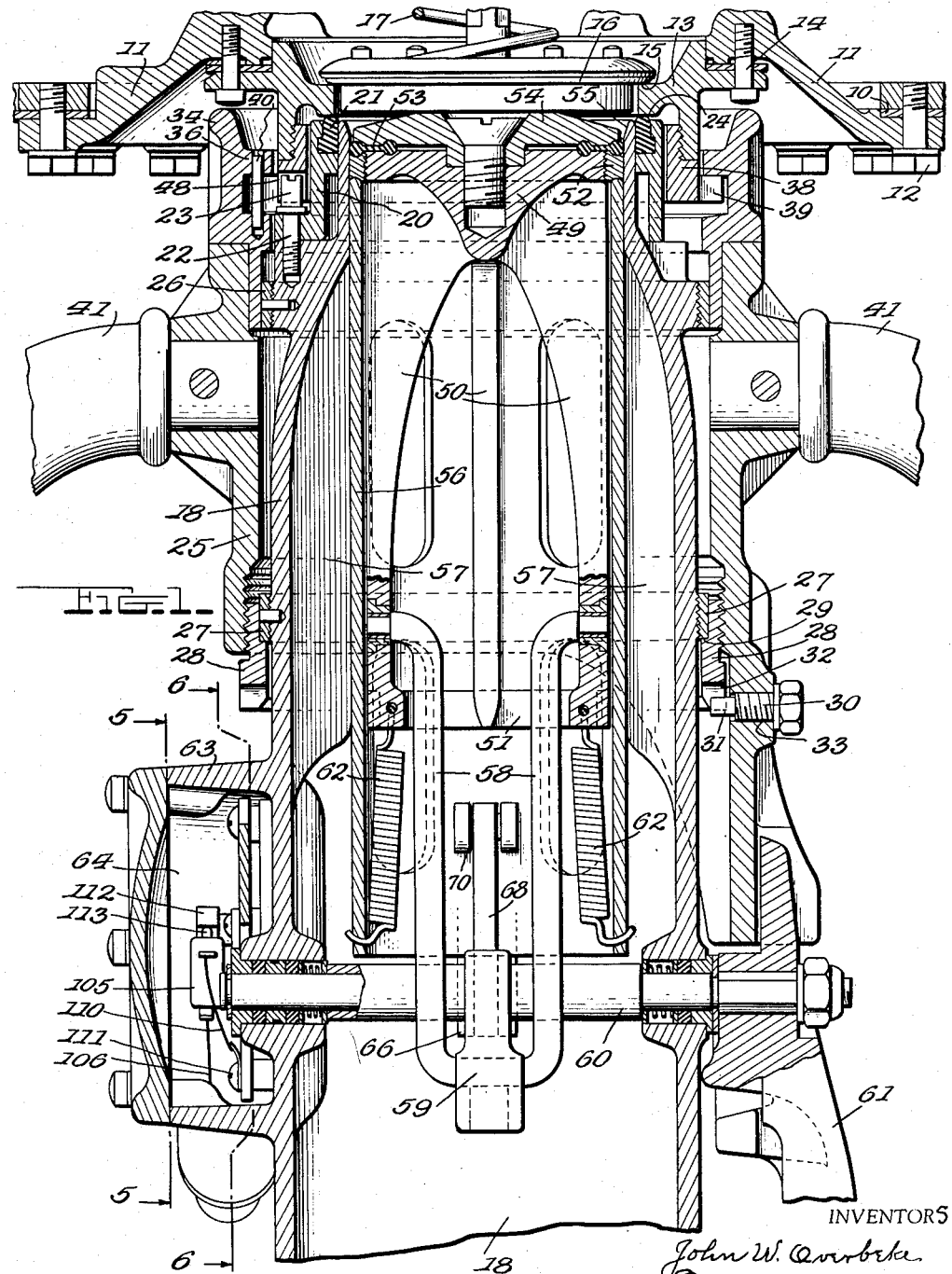
INVENTORS
John W. Overbeke
Everett H. Badger Jr.
BY Mason, Porter, Diller & Stewart
ATTORNEYS

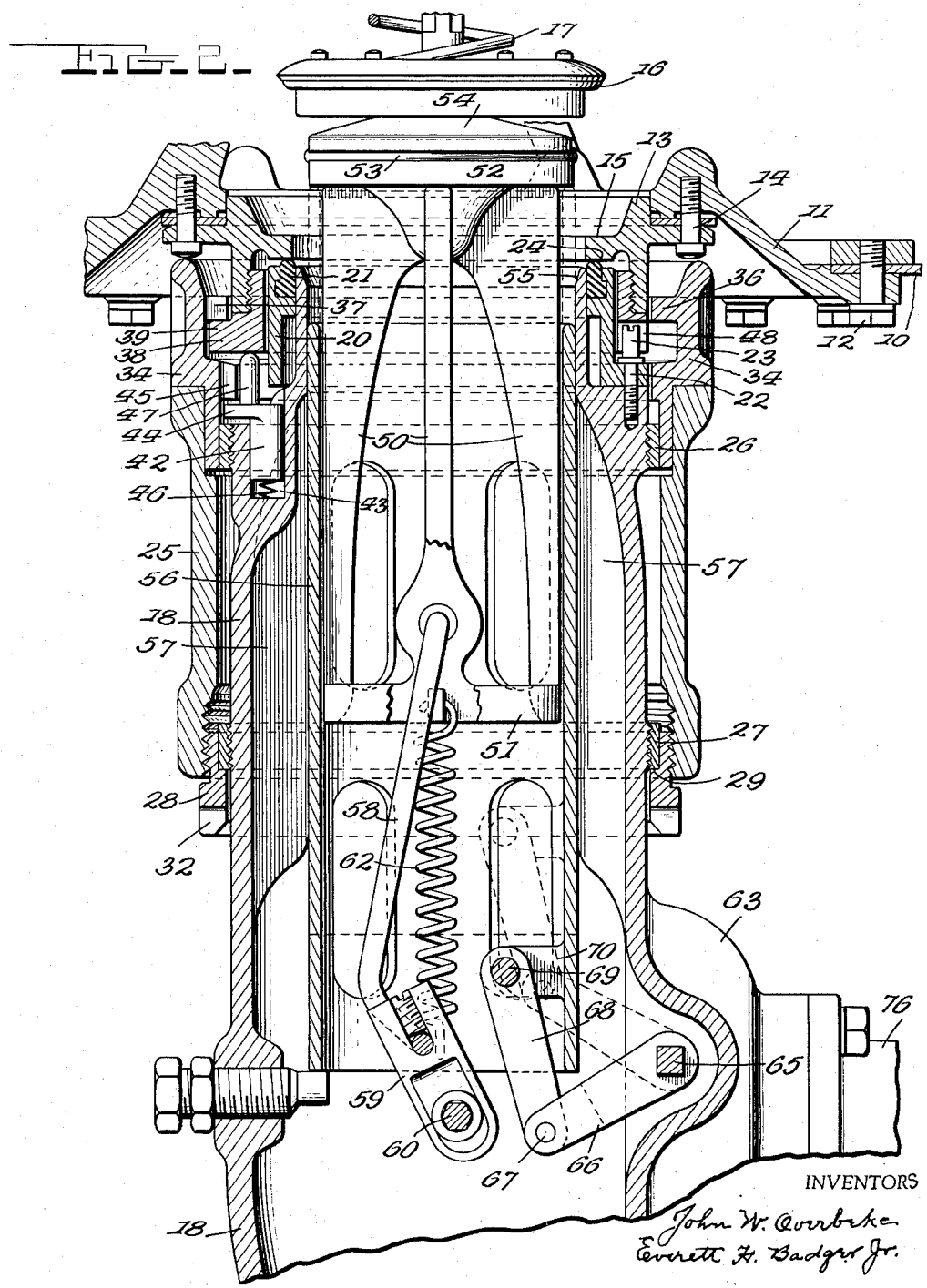

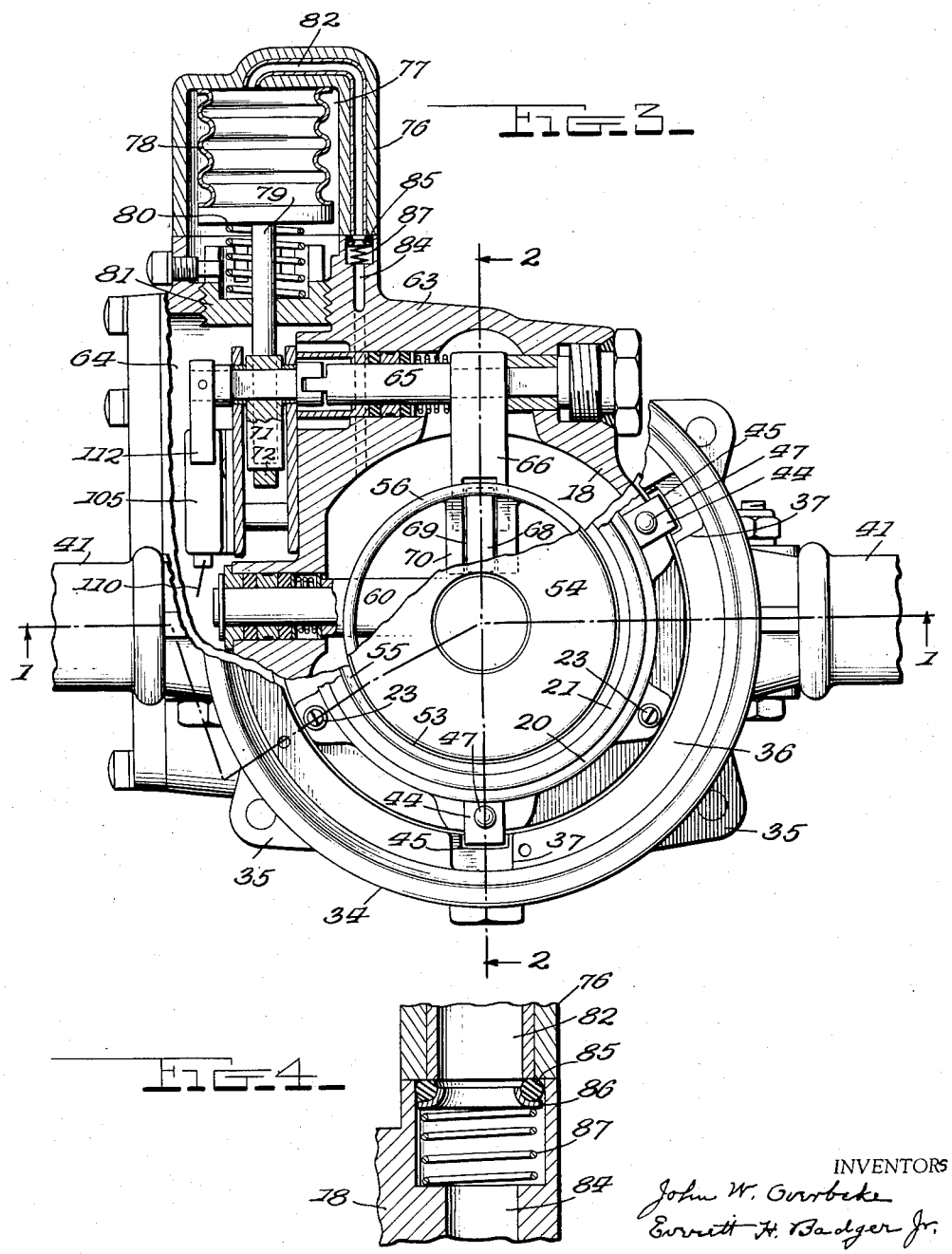

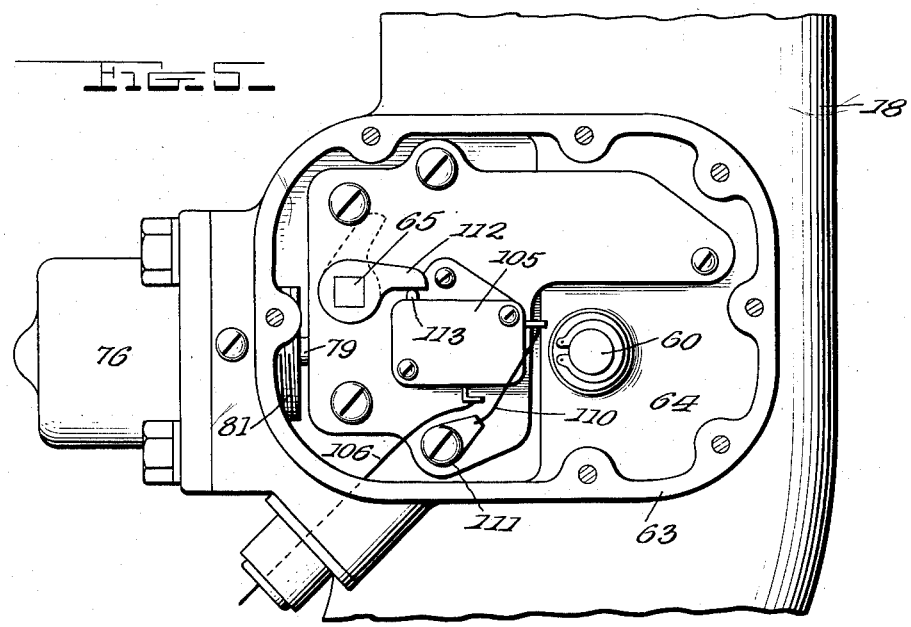
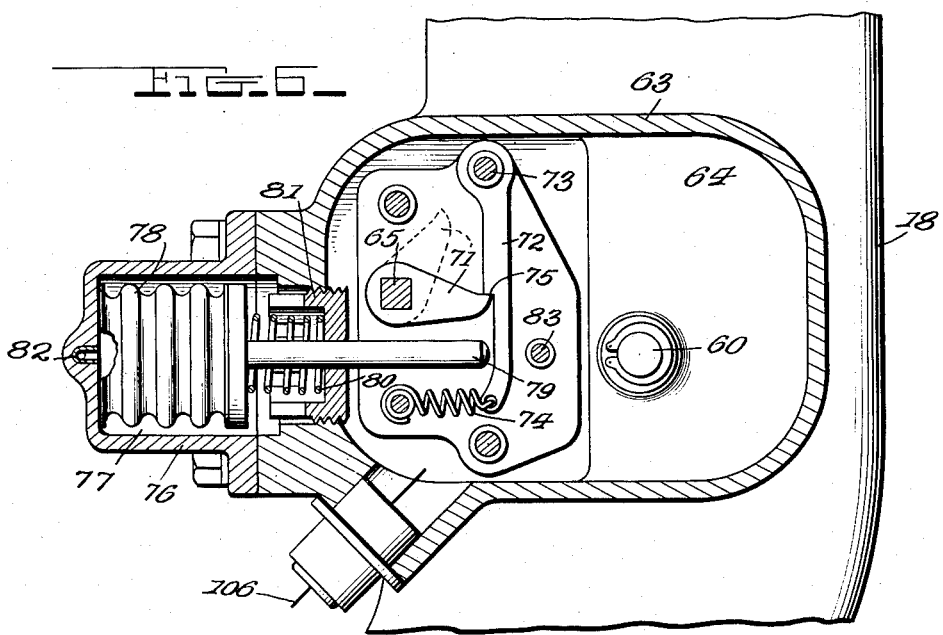

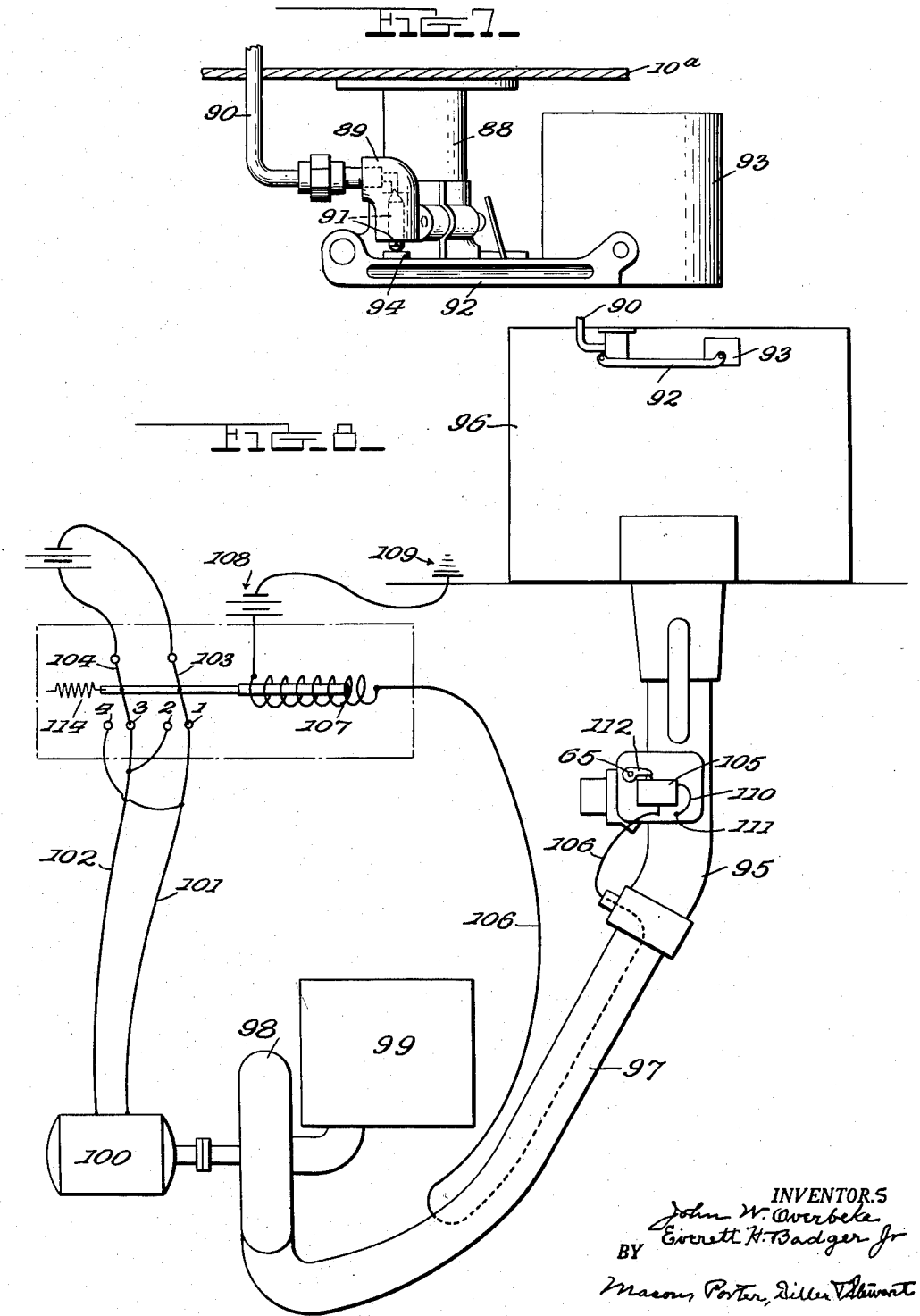

United States Patent Office 2,703,096
Patented Mar. 1, 1955

2,703,096

FUELING NOZZLE WITH PRESSURE OPERATED SHUTOFF

John W. Overbeke, Cleveland Heights, Ohio, and Everett H. Badger, Jr., Los Angeles, Calif., assignors to The Parker Appliance Company, Cleveland, Ohio, a corporation of Ohio Application April 17, 1951, Serial No. 221,456

14 Claims. (Cl. 137—235)

The invention relates to new and useful improvements in a nozzle and associated devices for fueling tanks of airplanes and the like.

An object of the invention is to provide a fueling nozzle and associated devices wherein the flow of fuel through the nozzle to the tank is controlled by the back pressure on the flowing fuel in the nozzle when the pressure on the tank reaches a predetermined degree.

A further object of the invention is to provide a fueling device of the above type wherein the flow of fuel to the tank is controlled by a main valve disposed in the nozzle and movable manually to open position and wherein the flow of fuel through the open valve is stopped by an auxiliary valve disposed in said nozzle and controlled by the fluid pressure on the fuel in the tank.

A further object of the invention is to provide a fueling device of the above type wherein the auxiliary valve is moved to close the ports by springs and is held in open position by a latch released when the back pressure on the flowing fuel in the nozzle reaches a predetermined degree.

A still further object of the invention is to provide a fueling device of the above type wherein the latch for releasing the auxiliary valve is controlled by a Sylphon bellows connected to the flow line in the nozzle, which bellows is expanded and releases the latch when the pressure on the tank reaches a predetermined degree.

These and other objects will in part be obvious and will in part be hereinafter more fully disclosed.

In the drawings, which show by way of illustration one embodiment of the invention:

Figure 1 is a longitudinal sectional view through the nozzle on the line 1—1 of Figure 3, the nozzle being attached to a tank and with the main valve closed.

Figure 2 is a longitudinal sectional view through the nozzle taken on the line 2—2 of Figure 3 and showing the main valve in open position so that fuel will flow from the nozzle into the tank.

Figure 3 is a view of the nozzle detached, partly in end elevation and partly in section.

Figure 4 is an enlarged sectional view showing the fluid-tight joint between the conduit leading to the nozzle and the conduit leading to the latch-releasing mechanism.

Figure 5 is a sectional view on the line 5—5 of Figure 1.

Figure 6 is a sectional view on the line 6—6 of Figure 1.

Figure 7 is a view in side elevation of a vent for the tank and a float for controlling the vent.

Figure 8 is a diagrammatic view showing the fuel supply pump and the associated control devices for stopping the flow of fuel to the nozzle when the supply of fuel from the nozzle to the tank is shut off and the nozzle is ready for releasing its connection to the tank.

Referring in detail to the illustrated embodiment of the invention, a portion of the bottom wall of a tank is indicated at 10. This bottom wall has an opening therethrough. A plate 11 surrounding the opening is clamped to the bottom wall of the tank by suitable bolts 12. This attachment plate has a central opening and attached thereto at said opening is a ring member 13 secured in sealed engagement with the plate by bolts 14. This valve seat carrying member 13 is provided with a valve seat 15 with which a tank valve 16 is adapted to make sealing engagement when the valve is in closed position. The valve 16 is of the usual construction and is mounted in the tank for movements toward and away from the seat 15 and is held in engagement with the seat by means of a spring 17.

The nozzle includes an inner sleeve 18 to which a fuel supply hose may be attached in the usual manner. The inner sleeve 18 carries at its outer end a ring 20 to which a gasket 21 is connected. This ring 20 is secured to the inner sleeve by screws 22. There is a plurality of screws 22 and each screw has a cylindrical head 23, the purpose of which will be described later. The gasket 21 is adapted to be pressed against a seat 24 to make a sealed connection with the ring member 13.

This connecting of the inner sleeve to the plate 11 is accomplished by an outer sleeve 25. The inner sleeve carries bearing rings 26, 27, and the outer sleeve is rotatably mounted on these bearing rings. Attached to this outer sleeve 25 is a clamping ring 28, said ring has a threaded connection with the outer sleeve and has a shoulder 29 which engages the under face of the bearing ring 27. This clamping ring may be turned into the outer sleeve for taking up wear and tightening the seal between the gasket 21 and the ring member 13. The clamping ring is held in a set position by means of a screw 30 having a projecting inner end portion 31 adapted to engage notches 32 in the clamping ring. See Figure 1. The outer sleeve has a series of openings 33 adapted to receive the screws 30. These openings are spaced at a shorter distance than the spacing of the notches and this provides for the adjusting of the clamping ring through small increments of movement for firmly locking the same in a set position by the insertion of the screws 30.

Mounted on the outer end of the sleeve 25 is a ring-shaped member 34 which is secured to the sleeve by laterally projecting ears indicated at 35 in Figure 3. Suitable screws pass through the ears and rigidly attach the member 34 to the outer sleeve of the nozzle. The member 34 has an inwardly projecting ledge 36 which is provided at intervals with slots as indicated at 37 in Figures 2 and 3.

The valve seat carrying member 13 has connected thereto a sleeve 38. This sleeve is provided with laterally projecting lugs 39. The lugs are adapted to pass through the slots 37 and when the sleeve is turned relative to the lugs, the lugs will pass beneath the ledge 36 and their tapered faces will force the sleeve toward the tank attachment, thus forcing the gasket carried by the inner sleeve into tight sealing contact with the seat 24. There are stop pins 40 which serve to limit the extent to which the outer sleeve can be rotated relative to the attachment plate. There are handle members 41, 41 connected to the outer sleeve for rotating the same.

When the nozzle is detached from the tank, the outer sleeve is locked from rotation on the inner sleeve. This is accomplished by dogs 42, one of which is shown in Figure 2. These dogs are mounted in recesses 43 formed in the inner sleeve and each dog has a holding lug 44 adapted to engage a notch 45 in an inwardly projecting portion of the outer sleeve member 34. There is a spring 46 which normally presses the dog upwardly as viewed in Figure 2 until it engages the notch 45. Each dog has a pin 47 and when the nozzle is connected to the tank, these pins engage the under face of the sleeve 38 which causes the dogs to move out of the notches and release the sleeve so that it may be turned relative to the inner sleeve.

The cylindrical heads 23 of the screws 22 are adapted to engage notches 48 in the sleeve 38 and this will prevent the inner sleeve from turning while it is being attached to the tank.

From the above description, it will be apparent that a nozzle attachment has been provided consisting of inner and outer sleeve which are locked together and held from rotation one on the other when the nozzle is detached from the tank. When the inner sleeve is placed for attachment to the tank, this connection between the inner sleeve and the outer sleeve is released so that the outer sleeve can be turned. Means is also provided for holding the inner sleeve from turning during the rotation of the outer sleeve and drawing the inner sleeve into tight sealing contact with the attachment plate of the tank.

Mounted within the nozzle is a main nozzle valve which includes a head 49 at the outer end thereof and spaced radial ribs 50, 50 which extend inwardly into the nozzle and are connected at their lower ends by a ring member 51. Attached to the valve head is a ring 52 having a gasket seat at its upper face and a valve seat at its lower face. A gasket 53 is clamped against the valve head by a cap 54. The gasket is so dimensioned that when the valve is in the position shown in Figure 1, it will contact with the inner face of the inner sleeve and make a tight seal for closing the nozzle. The sleeve valve has a tapered portion 55 which facilitates the passing of the gasket into the inner sleeve valve.

Surrounding this manually operated valve is an auxiliary sleeve valve 56. The inner nozzle sleeve has a cylindrical portion at its outer end with which this auxiliary valve makes contact. It also has projecting radial ribs 57 which further support the auxiliary valve 56 in its endwise movements. The outer end of the auxiliary valve engages the valve seat on the inner face of the ring 52 carried by the head 49. Ribs 50 of the manually operated valve contact with the inner face of the auxiliary sleeve valve and this aids in guiding the manually operated valve when it is moved from closed to open position.

This manually operated valve is moved by means of a U-shaped link 58 which is pivotally connected to diametrically opposed ribs 50, 50 on the main valve. This connection between the link and the valve is a pivotal connection so that the link is free to spring thereon. The link is connected at its outer end to a crank 59 on a shaft 60. This shaft 60 is mounted for oscillation in the inner nozzle sleeve. The bearings for the shaft 60 have suitable packing so that fluid passing through the nozzle will not leak out through the bearings. This shaft 60 is provided with a handle 61 by which the shaft may be turned to move the main valve from closed position as shown in Figure 1 to an open position as shown in Figure 2. When the valve is in closed position, a pivotal connection of the link 58 to the crank 59 moves slightly past a line passing through the axis of the operating shaft and the pivotal points of the link connection to the valve. This aids in holding the valve closed.

The auxiliary valve sleeve is extended by heavy springs 62, 62 which are connected at one end to the ring member 51 forming a part of the manually operated valve and they are connected at their other end to the auxiliary sleeve valve so that the springs are constantly urging the sleeve valve outwardly, when the manually operated valve is in open position.

The inner nozzle sleeve in the region of the operating shaft 60 has an extension 63 which is chambered as indicated at 64. A shaft 65 is journalled in this extension and extends into the chamber. The shaft carries an arm 66 which is pivoted at 67 to a link 68. The link in turn is pivoted at 69 to a lug 70 formed integrally with the sleeve valve and projecting inwardly therefrom. The purpose of this link connection between the inner sleeve valve and the shaft 63 is to provide a latching means for holding the auxiliary valve in retracted position when the main valve is moved into the tank to the position shown in Figure 2. When the auxiliary valve is latched in the position shown in this figure, then the fuel can flow freely through the ports in the side wall of the main valve and into the tank. When the auxiliary sleeve is released, it will be moved by the springs into engagement with the valve seat on the head 49 of the main valve and this will close the ports.

Referring to Figure 6, the shaft 65 extends into the chamber 64 and on the end of the shaft is a latch 71. Located in the chamber is an arm 72 pivoted at 73. A spring 74 moves this arm to a position where the end of the latch 71 will engage a shoulder 75. This will hold the shaft from rotating in a counterclockwise direction as viewed in Figure 6, and it will hold the auxiliary valve sleeve in the position shown in Figure 2. With the auxiliary valve held in this inner position the turning of the shaft 60 moves the main valve outwardly, unseating the tank valve and exposing the ports so that fuel can flow through the ports into the tank.

The means for releasing the latch so that the auxiliary valve can move outwardly and close the ports is shown in Figures 3 and 6.

Mounted on the extension 63 is a cap sleeve 76. This cap sleeve provides a chamber 77 in which is located a Sylphon bellows 78. This Sylphon bellows carries a plunger 79. A spring 80 engages at one end an adjustable abutment 81 and at its other end it engages the bellows. This spring tends to collapse the bellows and hold the plunger 79 retracted and out of engagement with the arm 72. When fluid pressure is introduced into the bellows through the port 82, it will move the plunger forward and into contact with the arm 72 and move said arm against a stop 83. This releases the latch so that it is free to move and the shaft 65 will turn freely permitting the springs 62 to move the auxiliary valve outwardly to the position shown in Figure 2 and this will close the ports leading to the tank. The port 82 in the sleeve cap 76 is connected with a port 84 in the wall of the inner sleeve of the nozzle. This port 84 leads through the wall and connects to the fuel chamber within the nozzle. There is a seal between the ports 82 and 84 which includes an O-ring 85, the washer 86, and the spring 87, which forces the O-ring into the joint between the cap sleeve 76 and the extension 63. Fluid flowing through the nozzle will enter these ports 84 and 82 and flow into the bellows. The spring 80 is adjusted by threading the abutment 81 into or out of the chamber containing the bellows. By this adjustment, the tension of the spring is adjusted so that the bellows will be retracted to the position shown in Figure 6 when the fuel flowing through the nozzle is filling the tank. When the tank, however, reaches a predetermined pressure, it will cause a back pressure on the flowing fuel in the nozzle which is transmitted to the bellows and is sufficient to overcome the tension of the spring and therefore the latch will be released, and the auxiliary valve will close the ports and stop further flow of fuel into the tank.

In Figure 7 of the drawings, there is shown a float-controlled vent for the tank which is being filled. Attached to the inner surface of the wall 10ª of the tank is a depending standard 88. Carried by the standard is an L-shaped tubular member 89. A pipe 90 is attached to this tubular member and extends up through the wall 10ª of the tank. In the tubular member 89 is a valve seat and a valve 91 is adapted to engage the seat and close the vent opening. This valve is controlled by a lever 92 to which is attached a float 93. The lever has a lug 94 which bears against the lower end of the valve 91. When the tank is filled to a predetermined level, it will raise the float 93 and cause the valve 91 to close the vent opening. When the vent opening is closed, the pressure on the tank will build up rapidly and soon reach a point where the back pressure on the fuel flowing to the tank through the nozzle will act on the bellows with such force as to release the latch and this will cause the auxiliary valve to be moved by the springs to a position which closes the ports leading through the main valve to the tank.

After the fuel supply has been shut off, the main valve is manually moved to closed position through the link connection 58. This movement of the main valve to closed position will also move the auxiliary valve to the position shown in Figure 1. This moving of the auxiliary valve 56 to the position shown in Figure 1 will oscillate the shaft 65 through its link connection 68 with the auxiliary valve and this will return the latch 71 to the full line position shown in Figure 6. The flow of the fluid has been stopped and therefore the spring 80 will retract the plunger and permit the arm 72 to be moved by the spring 74 so as to bring the shoulder 75 into a position to be engaged by the latch. The auxiliary valve will be held in this latched condition when the nozzle is detached from the tank.

In Figures 5 and 8, there is shown a means whereby the supply of fuel to the nozzle will be cut off when the main and auxiliary valves are moved to closed position in the nozzle.

The nozzle is indicated at 95 and this nozzle is shown diagrammatically connected to the tank 96. A hose 97 is connected to the nozzle at one end and to a pump 98 at the other end. The pump receives fuel from the supply tank 99. The pump is rotated by a motor 100. The motor is supplied with current from a suitable source through the lines 101 and 102. Each line is connected to two contacts, for example, the line 101 is connected to the contacts 1 and 4, while the line 102 is connected to the contacts 2 and 3. The switch members 103 and 104 are shifted into engagement with these contacts so that when the switch members are in the position shown in Figure 8, the motor will be driven in one direction and when the switch members are moved to the contacts 2 and 4, respectively, then the motor will be driven in the opposite direction. When driven in one direction, it will supply fuel from the supply tank to the nozzle and from the nozzle to the airplane tank. When driven in the opposite direction, fuel will be drawn from the nozzle and returned to the supply tank. This will empty the nozzle and the hose of any fuel left therein when the valves are closed, or, if desired, the main valve may be manually opened and fuel drawn from the airplane tank and returned to the supply tank.

In the chamber 64 of the nozzle is a micro-switch 105. A line 106 leads from one terminal of the switch, preferably through the hose, to a solenoid 107. The other terminal of the solenoid is connected to a source of current supply 108 and the other terminal of the source of supply is connected to the airplane at 109. This grounds the circuit through the airplane. The other terminal 110 of the micro-switch 105 is grounded to the nozzle at 111 and the nozzle is, of course, connected to the tank so that this terminal of the micro-switch is grounded to the plane.

Mounted on the shaft 65 is an arm 112. This arm is moved from the dotted line position shown in Figure 5 to the full line position shown therein. When in the full line position, it engages the operating finger 113 of the micro-switch and closes the circuit on the solenoid 107. The closing of the micro-switch will energize the solenoid 107 and this will shift the switches 103, 104 so as to reverse the motor and cause the pump to draw the fuel out of the nozzle and hose, returning it to the supply. By a suitable switch at the supply, the current supplied to the motor will be cut off and the motor will stop. When the nozzle is detached and the plug 109 is detached, then the current on the solenoid 107 is cut off and the spring 114 will shift the switches to a position where, when the motor is again started, it will supply fuel to the nozzle. When the nozzle is attached to a tank for filling and the grounding plug 109 attached, then the siwtches 103 and 104 will be shifted so that fuel is supplied to the nozzle when the main circuit is closed and current is supplied to the motor.

Many of the details of construction of the nozzle and its attaching means, the main and auxiliary valves, and the operating means therefor, are shown, described and claimed in a copending application filed by Everett H. Badger, Jr., Carl P. Dahl, and John W. Overbeke, Serial No. 159,346, filed May 1, 1950. These various elements broadly are essential to the control of the fuel supply, and the means illustrated in this application for controlling the supply by back pressure on the flowing fuel in the nozzle when the pressure on the tank reaches a predetermined degree.

It is obvious that many changes may be made in the devices associated with the nozzle and controlled by the back pressure on the flowing fuel for closing the ports when the pressure on the tank reaches a predetermined degree, without departing from the spirit of the invention as set forth in the appended claims.

We claim:

1. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, spring actuated means for closing said ports, a latch for holding said closing means in open position, and fluid pressure means associated with the nozzle and actuated by the back pressure on the flowing fuel in the nozzle for releasing the latch and closing said ports when the pressure on the tank reaches a predetermined degree and while the manually operated valve is in open position.

2. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while said manually operated valve is in open position, springs for moving the sleeve valve, a latch for holding the sleeve valve in retracted position, and fluid pressure means actuated by the back pressure on the flowing fuel in the nozzle for releasing the latch for closing the ports when the pressure on the tank reaches a predetermined degree.

3. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while the manually operated valve is in open position, springs for moving said sleeve valve to close the ports, a latch for holding the sleeve valve in retracted position, a plunger for releasing the latch, a spring for holding the plunger in retracted position, a fluid pressure means actuated by the back pressure on the flowing fuel in the nozzle when the pressure on the tank reaches a predetermined degree for moving the plunger to release the latch.

4. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while the manually operated valve is in open position, springs for moving said sleeve valve to close the ports, a latch for holding the sleeve valve in retracted position, a plunger for releasing the latch, a spring for holding the plunger in retracted position, fluid pressure means actuated by the back pressure on the flowing fuel in the nozzle when the pressure on the tank reaches a predetermined degree for moving the plunger to release the latch, and means for varying the tension on the spring for holding the plunger in retracted position for varying the back pressure on the flowing fuel required to release the latch.

5. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while the manually operated valve is in open position, springs for moving said sleeve valve to close the ports, a latch for holding the sleeve valve in retracted position, a plunger for releasing the latch, a bellows connected to said plunger and having a fluid chamber connected with the fuel passage in the nozzle, a spring for collapsing the bellows so as to normally hold the plunger out of contact with the latch, said spring being tensioned so that when the fluid pressure reaches a desired predetermined degree in the bellows the plunger will be actuated to release the latch.

6. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while the manually operated valve is in open position, springs for moving said sleeve valve to close the ports, a latch for holding the sleeve valve in retracted position, a plunger for releasing the latch, a bellows connected to said plunger and having a fluid chamber connected with the fuel passage in the nozzle, a spring for collapsing the bellows so as to normally hold the plunger out of contact with the latch, said spring being tensioned so that when the fluid pressure reaches a desired predetermined degree in the bellows the plunger will be actuated to release the latch, and means for adjusting the tension on the spring for varying the pressure required for releasing the latch.

7. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the noggle movable relative to the manually operated valve for closing said ports while the manually operated valve is in open position, springs for moving said sleeve valve to close the ports, a shaft mounted in the wall of the nozzle and extending into a recess on the interior of the nozzle, an arm carried by said shaft, a link connecting said arm to said sleeve valve, a dog mounted on said shaft exterior of said nozzle, a latch having a shoulder adapted to be engaged by said dog, and means controlled by the back pressure on the flowing fuel in the nozzle for releasing the latch whereby said sleeve will move to close the ports.

8. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while the manually operated valve is in open position, springs for moving said sleeve valve to close the ports, a shaft mounted in the wall of the nozzle and extending into a recess on the interior of the nozzle, an arm carried by said shaft, a link connecting said arm to said sleeve valve, a dog mounted on said shaft exterior of said nozzle, a latch having a shoulder adapted to be engaged by said dog, a plunger for releasing the latch actuated by the back pressure on the flowing fuel in the nozzle when the pressure on the tank reaches a predetermined degree.

9. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while the manually operated valve is in open position, springs for moving said sleeve valve to close the ports, a shaft mounted in the wall of the nozzle and extending into a recess on the interior of the nozzle, an arm carried by said shaft, a link connecting said arm to said sleeve valve, a dog mounted on said shaft exterior of said nozzle, a latch having a shoulder adapted to be engaged by said dog, a plunger for releasing the latch actuated by the back pressure on the flowing fuel in the nozzle when the pressure on the tank reaches a predetermined degree, a spring for holding the plunger in retracted position, and means for adjusting the tension on the spring for varying the pressure required for releasing the latch.

10. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while the manually operated valve is in open position, springs for moving said sleeve valve to close the ports, said nozzle having an extension provided with a chamber, a bellows in said chamber, said nozzle having a passage connecting the interior of the bellows with the interior of the nozzle, a plunger head for closing the inner end of said bellows, a plunger carried thereby, a spring bearing on said plunger head and operating to hold the plunger retracted, an adjustable abutment for said spring, and a latch for holding the sleeve valve in retracted position, said spring being tensioned so that when the back pressure on the fluid reaches a predetermined degree, the plunger will be actuated to release the latch and permit the sleeve valve to close the ports.

11. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, said tank having a vent opening, means for closing the vent opening when the fuel in the tank reaches a predetermined level, and means operated independently of said manually operated valve for closing said ports while said manually operated valve is in open position, said last named means being controlled by the back pressure developing on the flowing fuel in the nozzle, when the vent opening is closed, for closing the ports.

12. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing the ports while said manually operated valve is in open position, springs for moving the sleeve valve, a latch for holding the sleeve valve in retracted position, said tank having a vent opening, means for closing said vent opening when the fuel in the nozzle reaches a predetermined level, and means associated with the nozzle and controlled by the back pressure developing on the flowing fuel in the nozzle, when the vent opening is closed, for releasing the latch and permitting the sleeve valve to move and close the ports.

13. A fueling system for a closed vented fuel tank having a filling opening controlled by a spring closed valve comprising a nozzle, means for securing the nozzle to the tank, a manually operated valve disposed within the nozzle for closing the same and movable into the tank for opening the tank valve and exposing ports in said manually operated valve leading from the nozzle into the tank, said tank having a vent opening, a valve for closing said opening, a float operated lever for moving the valve to closed position when the fuel in the tank reaches a predetermined level, and means operated independently of said manually operated valve for closing the valve ports while said manually operated valve is in open position, said last named means being controlled by the back pressure developing on the flowing fuel in the nozzle, when the vent opening is closed, for closing the ports.

14. A fueling system for a closed vented fuel tank having a filling opening controlled by a spring closed valve comprising a nozzle, means for securing the nozzle to the tank, means for supplying fuel to the nozzle, a manually operated valve disposed within the nozzle for closing the same and movable into the tank for opening the tank valve and exposing ports in said manually operated valve leading from the nozzle into the tank, a sleeve valve within the nozzle movable relative to the manually operated valve for closing said ports while said manually operated valve is in open position, springs for moving the sleeve valve, a latch for holding the sleeve valve in retracted position, and means controlled by the back pressure on the flowing fuel in the nozzle for releasing the latch for closing the ports when the pressure on the tank reaches a predetermined degree, and means for stopping the flow of fuel to the nozzle when the manually operated valve and sleeve valve are returned to closed position in the nozzle.

References Cited in the file of this patent

UNITED STATES PATENTS

| | | |
|---|---|---|
| 2,556,221 | Simiran | Jan. 12, 1951 |
| 2,580,466 | Simiran | Jan. 1, 1952 |